United States Patent [19]
Haskell

[11] 3,723,571
[45] Mar. 27, 1973

[54] DISPERSION POLYMERIZATION OF VINYLIDENE CHLORIDE COPOLYMER

[75] Inventor: Vernon Charles Haskell, Sleepy Hollow Estates, Va.

[73] Assignee: E. I. duPont de Nemours and Company, Wilmington, Del.

[22] Filed: Nov. 19, 1971

[21] Appl. No.: 200,612

Related U.S. Application Data

[60] Continuation of Ser. No. 18,391, Feb. 27, 1970, which is a division of Ser. No. 652,684, July 12, 1967, abandoned.

[52] U.S. Cl. ............260/836, 117/145, 117/161, 260/32.8 R, 260/32.8 N, 260/33.2 R, 260/33.6 UA, 260/881, 260/884
[51] Int. Cl. .............................................C08f 15/40
[58] Field of Search .......260/884, 881, 33.6 UA, 836

[56] References Cited

UNITED STATES PATENTS

| | | | |
|---|---|---|---|
| 3,326,838 | 6/1967 | Bolstad et al. | 260/31.2 |
| 3,232,903 | 2/1966 | Schmidle et al. | 260/33.6 |
| 3,309,330 | 3/1967 | Settlage | 260/29.6 |
| 3,382,297 | 5/1968 | Thompson | 260/875 |

*Primary Examiner*—Samuel H. Blech
*Assistant Examiner*—John Seibert
*Attorney*—Claude L. Beaudoin

[57] ABSTRACT

A process for preparing a copolymer of vinylidene chloride is provided wherein the copolymer is of between 70 percent and 85 percent by weight of vinylidene chloride and is of spherical particle form wherein the spherical particles have a diameter between 1 and 5 microns, and wherein the copolymer is prepared in the presence of a polymeric dispersing agent.

2 Claims, No Drawings

DISPERSION POLYMERIZATION OF VINYLIDENE CHLORIDE COPOLYMER

REFERENCE TO RELATED APPLICATIONS

This is a continuation of copending application Ser. No. 18,391, filed Feb. 27, 1970, which inturn is a division of Ser. No. 652,684, filed July 12, 1967, now abandoned.

THE INVENTION

The present invention relates to a composition of matter, coating compositions thereof and an article of manufacture prepared therewith. More particularly, the present invention is directed to improvements in and relating to polymerized vinylidene chloride, coating compositions of polymerized vinylidene chloride and laminar structures comprising a base film coated therewith.

Coating compositions of vinyl polymers and copolymers useful, for example, for coating base film structures such as transparent regenerated cellulose, are well known. To illustrate, U.S. Pat. No. 2,570,478 describes the coating of flexible and transparent regenerated cellulose film structures with copolymer compositions of vinylidene chloride, acrylonitrile and itaconic acid. Such laminar or coated film structures are desirable for use as packaging materials because characterized by a unique combination of physical properties such as heat sealability, good barrier performance in respect to protection against permeation of water vapor or undesired gases as well as resistance of the structure to permeation of greases and the like. The main drawback of such polymers of vinylidene chloride and laminar or coated film structures prepared therewith resides in the lack of satisfactory slip and blocking characteristics. Attempts to remedy this defect have centered principally on using inorganic or mineral particles such as talc, clays, etc. For instance, in order to overcome unfavorable surface characteristics, such as poor slip, the practice has developed to dust the film surfaces with particles of dry material such as talc, etc., or to treat the surfaces with a liquid that will deposit solid particles on the film. In other instances particles of solid materials are incorporated directly into the coating compositions. Difficulties are encountered in these approaches in that dusted materials tend to produce films with objectionable surface haze and loosely attached particles may be rubbed off. Furthermore, the dusted film will often give difficulty in continuous printing machines. Incorporation of the particulate material into the coating composition in sufficient amount for good slip is likely to result in hazy coatings. Moreover, the moisture permeability of the coated film is oftentimes seriously impaired. It is, therefore, the principal object of the present invention to provide improved polymers of vinylidene chloride and coating compositions thereof useful for coating base film structures such as those of regenerated gel cellulose.

According to the present invention there is provided a copolymer of between about 70 percent and about 85 percent by weight, based upon the total monomer weight, of vinylidene chloride and at least one other ethylenically unsaturated monomer copolymerizable therewith, said copolymer characterized by spherical particles having an average diameter of between about 1 and about 5 microns. The copolymer of the invention may preferably additionally contain between about 1 percent and about 3 percent by weight, based upon the total monomer weight, of a cross-linking agent. In one embodiment, the invention comprises a coating composition of an aqueous dispersion of a copolymer of vinylidene chloride containing between about 0.01 percent and 1.5 percent by weight, based upon the total weight of said copolymer, of the copolymer above-described of spherical particles having an average diameter of between about 1 and about 5 microns.

According to the present invention there is further provided a moisture-resistant and heat-sealable film structure comprising a base film of organic polymeric material having firmly adhered to at least one surface thereof a coating comprising (a) a first copolymer of vinylidene chloride and at least one other ethylenically unsaturated monomer copolymerizable therewith and (b) between 0.01 percent and 1.5 percent by weight, based upon the weight of said first copolymer, of a second copolymer of between about 70 percent and about 85 percent by weight, based upon the total monomer weight of said second copolymer, of vinylidene chloride and at least one other ethylenically unsaturated monomer copolymerizable therewith, said second copolymer characterized by spherical particles having an average diameter between about 1 and about 5 microns. The moisture-resistant and heat-sealable film structure of the present invention preferably comprises a base layer of regenerated cellulose.

The nature and advantages of the copolymer, coating composition thereof and coated film structure of the present invention will be more clearly understood from the following description thereof.

The copolymer of the present invention is obtained from vinylidene chloride and at least one other ethylenically unsaturated monomer copolymerizable therewith. The copolymer of vinylidene chloride preferred for purposes of the invention contains at least about 70 percent by weight, based upon the total weight of monomers, of vinylidene chloride, and up to about 30 percent by weight, based upon the total weight of monomers, of one or more ethylenically unsaturated monomers copolymerizable therewith. Representative mono-olefinic monomers copolymerizable with vinylidene chloride include, for example, acrylic acid, methyl, ethyl, isobutyl, butyl, octyl and 2-ethyl hexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate and the corresponding esters of acrylic acid; methyl alpha-chloroacrylate, octyl alpha-chloroacrylate, methyl isopropenyl ketone; acrylonitrile, methacrylonitrile, methyl vinyl ketone, vinyl chloride; vinyl acetate; vinyl propionate; vinyl chloroacetate; vinyl bromide; styrene; vinyl naphthalene; ethyl vinyl ether; N-vinyl phthalimide; N-vinyl succinimide; N-vinyl carbazole; isopropenyl acetate; acrylamide; methacrylamide and alkyl substitution products thereof; phenyl vinyl ketone; diethyl fumarate; diethyl maleate; methylene diethyl malonate; dichlorovinylidene fluoride; itaconic acid; dimethyl itaconate; diethyl itaconate; dibutyl itaconate; vinyl puridine; maleic anhydride; allyl glycidyl ether and other unsaturated aliphatic ethers described in U.S. Pat. No. 2,160,943. The monomers may be generally defined as vinyl or vinylidene having a single

grouping. The most useful monomers fall within the general formula

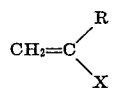

where R may be hydrogen, halogen, or saturated aliphatic radical, and X is a member of the group consisting of —Cl, —Br, —F, —CN, —C$_6$H$_5$, —COOH,

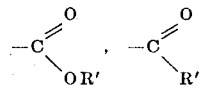

—HC=O, —OC$_6$H$_5$, —CONH$_2$, —CONH—R' and —CONR'$_2$ in which R' is alkyl.

The copolymer of the present invention is synthesized as an organosol in a solvent such as heptane using, for example, vinylidene chloride, methyl acrylate and acrylic acid. The copolymer of the invention is characterized by spherical particles preferably having an average diameter between about 1.2 and about 3.0 microns and no more than about 10 percent of the particles are less than 1.2 microns or more than 3.0 microns in diameter. The preferred particles are cross-linked and insoluble in an organic solvent combination such as toluene mixed with ethyl acetate, tetrahydrofurane or methylethylketone. The preferred use of the vinylidene chloride copolymer particles is their incorporation in a vinylidene chloride copolymer coating in an amount of 0.02 percent to 1.2 percent, based on the weight of the coating, to improve the slip properties thereof.

A typical copolymer, for example, contains 80 parts of vinylidene chloride, 20 parts of methyl acrylate, 5 parts of acrylic acid and 2 parts of allyl methacrylate. The polymerization is carried out in the presence of a polymeric stabilizer comprising predominately a polymer of 2-ethyl hexyl acrylate with one percent by weight of allyl acrylate as a graft polymerization site. A small amount of allyl methacrylate may be incorporated into the polymer as a cross-linking agent to provide resistance to swelling by coating solvents. A cross-linking agent is not necessary when using the spherical copolymer particles in an aqueous coating system, since the copolymer particles are substantially insoluble in aqueous media. Other cross-linking agents such as ethylene dimethacrylate also may be incorporated in the polymerization recipe. In order to produce a suspension of particles which do not coagulate during polymerization, it is generally necessary to withhold the addition of the cross-linking agent until the polymer particles have been formed, and then to react them with the cross-linking agent toward the end of the reaction cycle. The particles are found to be surprisingly uniform in size, so uniform that they form a hexagonal close-packed array when the suspension is dried on a microscope slide. Still another method of insolubilizing the particles comprises introducing a monomer such as glycidyl acrylate into the polymerization recipe. After the particles are formed, the glycidyl groups, unreacted to this stage, are coupled by curing the particles in the presence of an amine such as ethylene diamine. The cross-linking particles are insoluble in such solvents as tetrahydrofuran or methylethylketone and in mixtures of these solvents with toluene. The vinylidene chloride content, of the particles may range from 70 percent to about 85 percent.

According to the present invention there is further provided a moisture-resistant and heat-sealable film structure comprising a base film of organic polymeric material, preferably regenerated cellulose, having firmly adhered to at least one surface thereof a coating comprising the composition described hereinabove. The regenerated cellulose film may be prepared in accordance with the method described in U.S. Pat. Nos. 1,548,864 and 1,601,289 utilizing viscose casting techniques as described in any of U.S. Pat. Nos. 2,862,245; 3,073,733; 2,962,766; 3,050,775 and 2,254,203. The gelregenerated cellulose film so produced may be dried by passing the film over and in contact with a series of heated rolls in a heated chamber, as described in any of U.S. Pat. Nos. 2,000,079; 2,141,277; 2,746,166 and 2,746,167. The dried regenerated cellulose films so prepared contain usually about 5 percent to about 30 percent by weight, based upon the total weight of the cellulosic film, of a propylene glycol, and optionally between about 1 percent and about 10 percent by weight, based upon the total weight of the cellulosic film, of glycerol. The base film of regenerated cellulose is coated with the above described composition by any convenient coating technique.

The principle and practice of the present invention will now be illustrated by the following Examples which are provided to show the practice and use thereof, but it is not intended that the invention be limited thereto since modifications in technique and operation will be apparent to anyone skilled in the art. All parts and percentages in the following Examples are by weight unless otherwise indicated.

In the following Examples, the spherical polymer particle samples are characterized by examining a dried smear of the product with a light microscope using a 60X objective and 12.5X eyepiece. The spherical shape and uniformity of the particles is readily apparent by visual examination. The particle size is measured by making a photograph of a stage micrometer having spacings of 10 microns (micro-meters) between the smallest gradations thereof at the same magnification as a photograph of the polymer particles and counting the number of particles in a straight row between the points of a divider adjusted to the 10 micron spacing in the photograph of the stage micrometer. Dividing 10 by the number of particles gives the average particle diameter in microns (micro-meters). Replicate checks are made at several different locations in the photograph, and any variations are usually negligible.

EXAMPLE 1

A reaction mixture of 150 parts of heptane solvent, 176 parts of vinylidene chloride, 44 parts of methyl acrylate, 6 parts of acrylic acid and 20 parts of polymerizing stabilizer comprising a 30 percent solution of a copolymer of 99 parts of 2-ethyl hexyl acrylate with 1 part of allyl acrylate in heptane is thoroughly mixed and thereafter one-third of this charge is placed in a reaction flask fitted with stirrer and reflux condenser.

A solution of 1.5 parts of isobutyryl peroxide ("Lupersol 227" Wallace & Tiernan) in 44 parts of heptane is added to the above reaction mixture at a rate of 4.4 parts per hour. The reaction flask is kept at 55°C. at which temperature the reaction mixture refluxes gently. As the reaction proceeds an additional 44 parts of the original reaction mixture is introduced in the flask every 30 minutes. After 240 minutes, one part of ethylene dimethacrylate is introduced. After 330 minutes, all of the reaction mixture has been introduced into the reaction flask and the reaction is continued for a total of 21 hours. The copolymer reaction product consists of uniform particulates of spherical form having an average diameter of 2.6 microns.

The above procedure is repeated except that 2 parts of ethylene dimethacrylate are introduced into the reaction flask after 240 minutes. The copolymer particulate spheres have an average diameter of 2.8 microns.

The above procedure is repeated except that 5 parts of ethylene dimethacrylate are added after 240 minutes in the reaction cycle. The average particle size diameter is 2.8 microns.

EXAMPLE 2

In order to determine the usefulness of the copolymer particles in a coating solution, the solubility of the particles was measured as follows: Two parts of particles were suspended in 30 parts of a solution consisting of tetrahydrofuran and toluene in the ratio of 2:1 by volume. After agitation for 30 minutes at room temperature the suspension was centrifuged, the clear supernatant liquid was removed, and the weight of dissolved polymer obtained after evaporation to dryness. The wet residue was weighed, evaporated to dryness and reweighed. A correction was made for the dissolved polymer in the solvent retained by the residue in the first separation. The solubility was expressed as percent of the dry polymer particles added initially.

Experience with coated films showed that if the solubility was more than 10 percent, the particles were unsuitable for use in the corresponding solvent system because of excessive swelling and a tendency of the particles to be ejected from the coating during drying.

The copolymer sample of Example 1 containing the greatest amount of the ethylene dimethacrylate cross-linking agent was 78 percent soluble and was therefore unsuitable for use in the solvent coating system. Use of a cross-linking agent such as glycidyl acrylate obviates this difficulty as shown herebelow.

Following the procedure of Example 1 except that 10 parts of glycidyl acrylate were included in the monomer mixture and no ethylene dimethacrylate was added, and at the conclusion of the reaction, 2 hours after the last addition of monomer mixture, 10 parts of ethylenediamine were added and the temperature was raised from 55° to 70°C. After 16 hours at this temperature the particle diameter was 2.0 – 2.3 microns and the solubility was 3.6 percent, well below the acceptable upper limit of 10 percent for use in a solvent based coating composition.

EXAMPLE 3

Following the procedure described in Example 1, the effect of vinylidene chloride content on copolymer particle size is demonstrated by preparing a reaction mixture of 150 parts of heptane, 32 parts of the polymeric stabilizer of Example 1, 132 parts of vinylidene chloride, 30 parts of methyl acrylate and 8 parts of acrylic acid are placed in the reaction flask. There is next added drop-wise to the reaction mixture a total of 1.3 parts of isobutyryl peroxide as follows: one-half of the total amount is added initially followed thereafter by two separate additions of one-fourth of the total amount at one-half hour intervals. The reaction mixture is brought to 55°C. and carried to completion. The copolymer product of the reaction described above is in the form of uniform spherical particles having an average diameter of 1.5 microns.

The above procedure is repeated except that the quantity of vinylidene chloride is 147 parts and the quantity of methyl acrylate is 15 parts. The reaction product is slightly coagulated.

The above procedure is again repeated exactly as described above except that the quantity of the vinylidene chloride is 162 parts and no methyl acrylate is used. The product is substantially all coagulated. The effect appears to be that the tendency toward coagulation is increased as the vinylidene chloride content of the copolymer is increased.

EXAMPLE 4

Following the procedure described in Example 1, the effect of catalyst on copolymer particle size is demonstrated by preparing a charge of vinylidene chloride/methyl acrylate/acrylic acid monomer combination in a weight ratio of 76/19/5 in a concentration of 53 percent in heptane which is polymerized with isobutyryl peroxide at a temperature of 55°C. in the presence of the stabilizer of Example 1.

At a catalyst charge of 0.5 part in the above reaction mixture the average copolymer particle diameter is 1.1 microns. At a catalyst charge of 0.75 part the average particle diameter of the spherical particulate copolymer is 1.7 microns. At a catalyst charge of 1.0 part the average particle diameter of the spherical particulate copolymer is 2.2 microns. At a catalyst charge of 1.5 parts the average particle diameter of the spherical particulate copolymer is 2.0 microns. At a catalyst charge of 2.0 parts the average particle diameter of the spherical particulate copolymer is 1.3 microns. From these data the catalyst charge can be chosen to give any desired particle size between 1.0 and 2.2 microns. The copolymer particle size may also be effected by controlling the degree of conversion of the monomers as, for example, incomplete conversion to polymer at low catalyst concentrations results in particles of smaller diameter.

EXAMPLE 5

Following the procedure described in Example 1, the effect of stabilizers is demonstrated by utilizing a polymerization recipe of vinylidene chloride, methyl acrylate and acrylic acid monomers in the weight ratio of 76/19/5 and wherein the allyl methacrylate content of the stabilizing polymer is varied as shown in the Table below:

| % Allyl Methacrylate | Particle Diameter (um) |
|---|---|
| 0.25 | 2.0 – 2.6 |
| 0.50 | 2.2 – 2.6 |
| 1.00 | 1.7 – 2.0 |
| 2.00 | 1.5 – 1.8 |
| 4.00 | 1.0 – 1.5 |

The above data illustrates the suitable and operable range of allyl methacrylate concentration in the stabilizing polymer. With 4 percent allyl methacrylate, a second phase appeared along with the expected microscopic particles. This "matrix" was so finely divided that individual particles could not be resolved with the light microscope. At the other end of the range, 0.25 percent resulted frequently in the production of coagulated polymer rather than well dispersed particles.

In general, it is found that the average copolymer particle diameter decreases as the amount of allyl methacrylate increases, and, conversely, that the average copolymer particle diameter increases as the amount of allyl methacrylate in the stabilizing polymer is decreased.

EXAMPLE 6

A. Solvent Coating on Regenerated Cellulose Film

A coating composition comprising 20 percent by weight of a vinylidene chloride/methyl methacrylate/itaconic acid copolymer (weight ratio — 90/9.5/0.5) in a tetrahydrofuran/toluene solvent (75/25 weight ratio) and, based on the weight of the copolymer, 1 percent of calcium stearate, 2 percent of stearamide and varying amounts of spherical particles like those of Example 2 except having an average diameter of 1.6 microns, is coated on a film of regenerated cellulose and dried. The resulting film, carrying 3 grams of coating per square meter of film surface shows the improved performance on a bag making machine with no evidence of interfacial sticking of adjacent layers of coated film. Similar results are obtained with a vinylidene chloride/acrylonitrile/itaconic acid copolymer (weight ratio — 90.5/9/0.5) and with a vinylidene chloride/acrylonitrile/methyl acrylate/itaconic copolymer (weight ratio — 91.5/6/2/0.5) in the coating composition.

The test films containing spherical particles in the coating permit as much as a 20 percent gain in sealing speed on rotary sealing wheels over a comparable film containing a mineral particulate such as talc. Haze values of 1.5 percent for the test films versus 2.8 percent for control films and 10–15 percent lower water vapor permeability values for the test films over those of the control films are accompanying benefits. The test films show evidence of less abrasive action on contacted metal parts of packaging machines than the comparable control films.

B. Aqueous Coating Dispersion on Polypropylene Film

An aqueous coating composition comprising a 45 percent solids dispersion of a 77/19/4 weight ratio vinylidene chloride/methyl acrylate/acrylic acid interpolymer containing, based on the weight of the copolymer, 5 percent of Carnauba wax and 0.5 percent of the spherical particles of Example 1 having an average diameter of 2.8 microns, is coated on an oriented polypropylene film which has been flame treated for adherability. The resulting film, bearing about 6 grams of the above-described coating per square meter of surface, shows better slip properties and greater freedom from blocking than a comparable coated film containing talc in the coating composition in place of the spherical copolymer particles.

As described above, the spherical copolymer particles of the present invention are useful in aqueous and organic solvent coating compositions. A cross-linking agent is not essential when using the spherical copolymer particles in an aqueous coating system, since the copolymers are substantially insoluble in aqueous media. In general, the copolymer coatings will contain from 70 to about 85 percent of vinylidene chloride copolymerized with other ethylenically unsaturated monomers such as those illustrated for use in the synthesis of the copolymer particles.

What is claimed is:

1. A process for preparing a copolymer of vinylidene chloride characterized by spherical particles having an average diameter between about 1 micron and about 5 microns which comprises polymerizing between about 70 percent and about 85 percent by weight of vinylidene chloride, between about 10 percent and about 25 percent by weight of a monomer selected from the group consisting of methyl acrylate, methyl methacrylate and acrylonitrile, between about 3 percent and about 6 percent by weight of an unsaturated monocarboxylic acid selected from the group consisting of acrylic and methacrylic acids, in the presence of from 0.3 percent to 1.5 percent by weight, based upon the total weight of said monomers, of a free radical initiator and at a temperature between about 45°C. and about 65°C., in an aliphatic hydrocarbon solvent containing between about 5 percent and 15 percent, based upon the total weight of said monomers, of a polymeric dispersing agent comprising a copolymer of an alkyl ester of acrylic acid wherein the alkyl group contains between four and eight carbon atoms with from 0.1 percent to 2 percent, by weight of the monomers, of a polymerizable monomer selected from the group consisting of allyl acrylate and allyl methacrylate.

2. The process of claim 1 wherein the polymerizing monomers comprise additionally from 1 percent to 3 percent by weight, based upon the total weight of said monomers, of a cross-linking agent selected from the group consisting of allyl acrylate, allyl methacrylate, ethylene dismethacrylate, glycidyl methacrylate and glycidyl acrylate.

* * * * *